Jan. 23, 1934.      T. E. MILLINGTON      1,944,567
ADJUSTABLE LENS HOLDER
Filed March 27, 1933
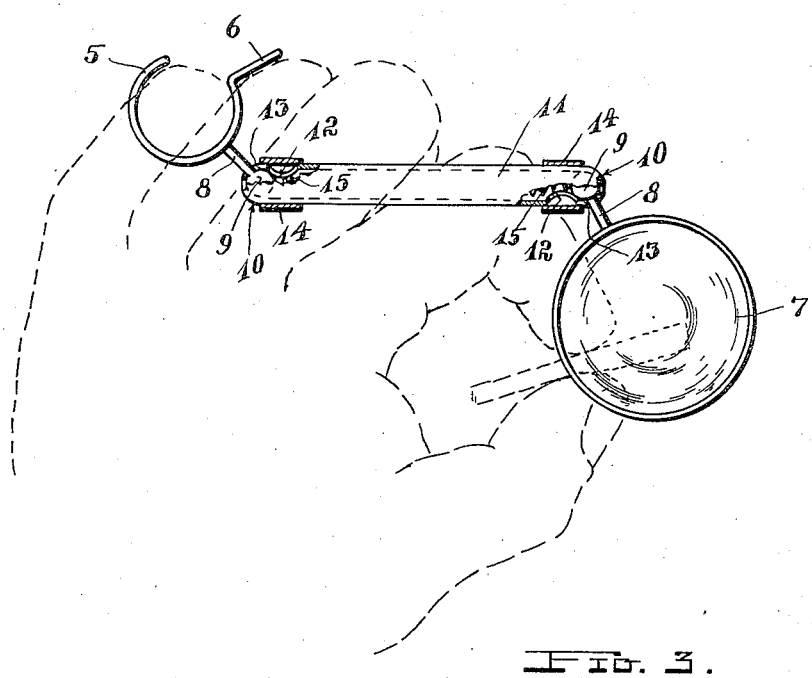
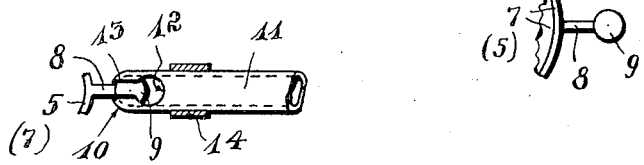
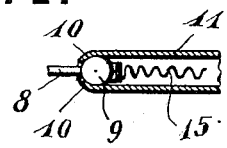
INVENTOR:
THOMAS E. MILLINGTON,
By: Otto H. Ruger,
his Atty.

Patented Jan. 23, 1934

1,944,567

UNITED STATES PATENT OFFICE 1,944,567

ADJUSTABLE LENS HOLDER

Thomas E. Millington, Pasadena, Calif.

Application March 27, 1933. Serial No. 662,979

3 Claims. (Cl. 88—39)

This invention relates to devices by which a magnifying lens can be held adjustably in the hand of a user.

One of the objects of this invention is to provide a holder that will allow the use of fingers while a lens is held by the hand in a rather firm and positively focusing manner.

Another object is to provide a holder that can be focused to different points with respect to fingers of a hand holding and supporting the holder.

Another object is to provide a holder that can equally well be adjusted to different sizes of hands.

Another object is to provide a holder by which a lens is held yieldably under a suitable tension.

Other objects will appear from the following description and appended claims as well as from the accompanying drawing, in which—

Fig. 1 is a top plan view of the holder shown in a preferred position and relation to a hand indicated in dotted lines.

Fig. 2 is a fragmentary side elevation of one end of the handle member, the ball-end of an attachment inserted through the side opening with the closing sleeve pushed back.

Fig. 3 is a fragmentary side elevation of the ball-end of an attachment.

Fig. 4 is a fragmentary longitudinal section through one end of the handle.

In the majority of cases, where a person applies or uses a lens, it is perhaps essential to have one hand free to hold an article that is under observation and have the other hand free to do something on or to such an article.

On the other hand, many people unaccustomed to the use of so-called jeweler's lenses find it difficult to use them and often such a lens is not really practical in certain instances. For one thing, a lens held in a certain position with respect to an eye or at a certain distance from an eye is not so readily adaptable for different observations and actually puts the eye under a much greater strain than a lens held in the hand. The lens in the hand, furthermore, offers the great advantage that all adjustments can be accomplished with the lens with respect to the article under observation while the position of the observer remains steady and unchanged, particularly with respect to the distance between the eye and the article, and still, the distance between the eye and the article affects the focusing less critically than when the lens is fixed near the eye.

Though the lens holder or support disclosed herewith can be applied to a hand variously, a preferred position of the holder with respect to a hand is illustrated in Fig. 1.

An open loop-like portion 5 is provided at one end of the device, the open form allowing a snug fitting to any size of finger.

As illustrated, this loop-like portion 5 is preferably slipped over the smallest or fourth finger of a hand, the bent extension-end 6 serving to rest on or against the next finger.

A lens 7 is provided on the opposite end of the device.

Both attachments, the lens 7 as well as the loop 5, are provided with a stem 8 and a ball 9, as illustrated in Fig. 3.

The opposite ends 10 of a handle member 11 are crimped in as illustrated in Fig. 4. Near the crimped-in ends, suitably large apertures 12 are provided through which the balls can be slipped into the ends of the handle, and slots 13 extend from the apertures to the ends of the handle, through which the stems 8 can swing back and forth sidewise of the handle, the apertures being a suitable distance from the ends so that the balls rest in a suitable seat within the handle, the apertures 12 being closed by the sleeves 14, fitting snugly over the outside of the handle. A spring 15 is inserted between the oppositely arranged balls in the handle, maintaining the balls seated in the ends but swingable under the tension of the spring.

Under these conditions, the loop-like portion can be slipped over any finger, a short handle eventually requiring it to be on the third finger instead of on the fourth with especially broad hands, while a narrow hand may more conveniently have it on the fourth finger. The next finger or fingers are then preferably placed over the top of the handle, while the first finger is placed underneath the handle, thereby establishing and maintaining a firm grip on the holder with the first finger and the thumb remaining free to hold any article at a point to be in a desired focus under the lens 7, which may be swung around sidewise on the ball-support and turned around the axis of the stem 8, to assure a desired focusing within a great range.

While then an article is handled or held between the finger and the thumb below the lens, the other hand is free to work or operate on the article.

Various requirements may occur, and various conditions may bring different suggestions and developments, but from the above it will be clear that the device disclosed herewith can be firmly and still movably held in a great variety of positions that can be advantageous.

Having thus described my invention, I claim:

1. In a device of the class described, finger and lens supporting pieces having each a neck portion and a ball end, a tubular handle member partially closed at the ends to engage over the ball ends and so as to leave the neck-portions free to swing to different angles with respect to the longitudinal axis of the tubular member, and a spring inserted in the tubular member so as to hold the ball-ends towards the partially closed tubular ends of the handle.

2. In a device of the class described, finger and lens supporting pieces having each a neck-portion and a ball-end, a tubular handle-member partially closed at the ends to engage over the ball-ends and so as to leave the neck-portions free to swing, and a spring inserted in the tubular member between the oppositely disposed ball-ends, the tubular member having an aperture near each of its ends with a slot communicating with the open ends of the handle-member whereby the ball-ends can be inserted into the partially closed handle-ends with the neck-portions swingable in the slots.

3. In a device of the class described, finger and lens supporting pieces having each a neck-portion and a ball-end, a tubular handle-member partially closed at the ends, the handle-member having an aperture near each end with a slot communicating with the open end whereby the ball-ends can be inserted into the partially closed handle-ends with the neck-portions swingable within the slots, a spring in the handle-member between the ball-ends, and sleeve members over the apertures.

THOMAS E. MILLINGTON.